Feb. 14, 1967  R. J. HOLTON  3,303,542
FASTENERS
Original Filed Feb. 14, 1963  3 Sheets-Sheet 1
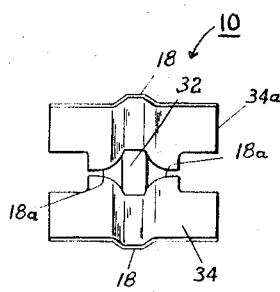
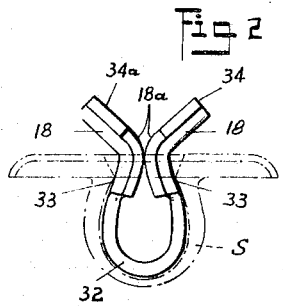
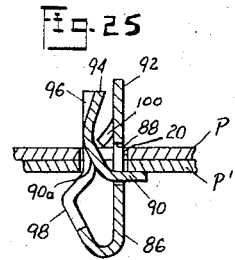
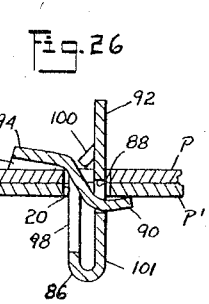
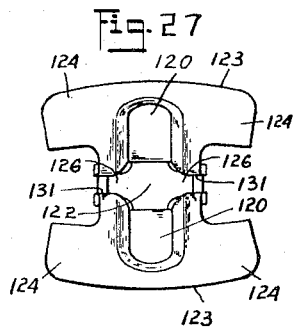
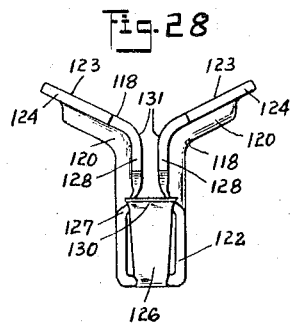
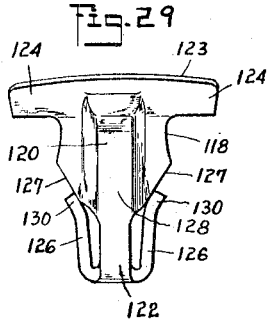
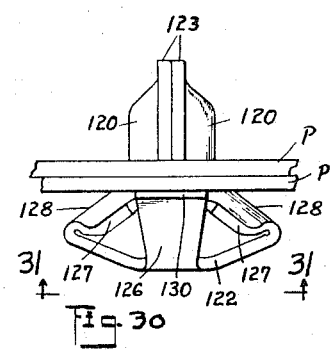
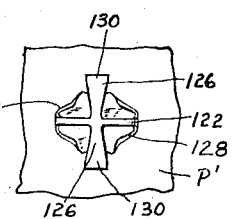
INVENTOR.
ROBERT J. HOLTON
BY Teare, Fetzer & Teare
ATTORNEYS Feb. 14, 1967 R. J. HOLTON 3,303,542
FASTENERS
Original Filed Feb. 14, 1963 3 Sheets-Sheet 2

INVENTOR.
ROBERT J. HOLTON
BY Teare, Fetzer & Teare
ATTORNEYS

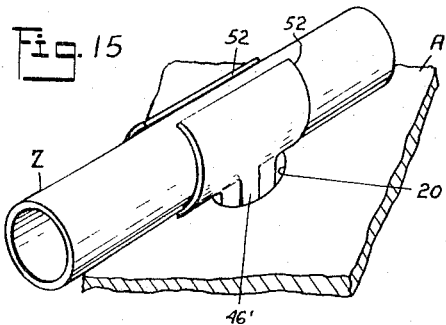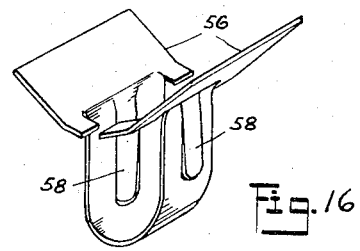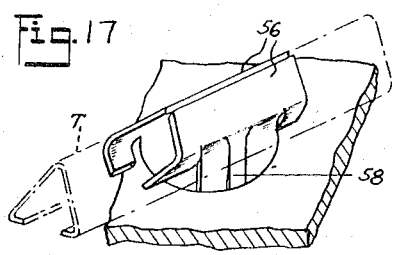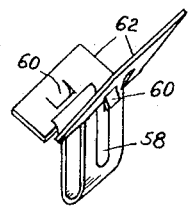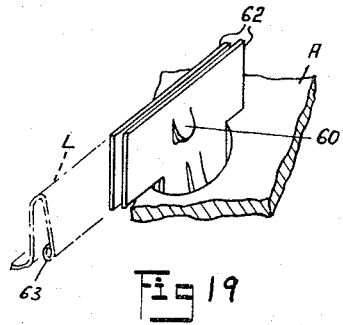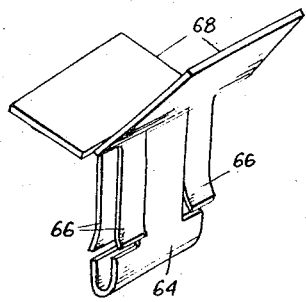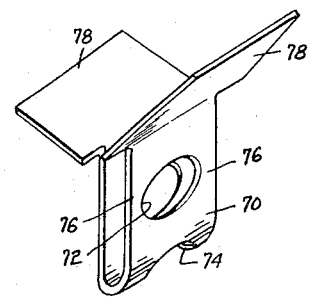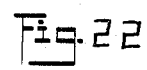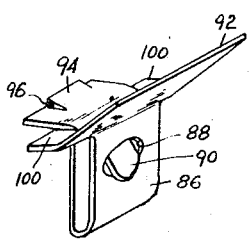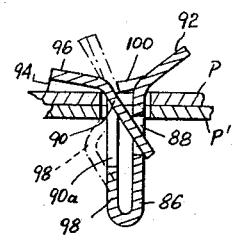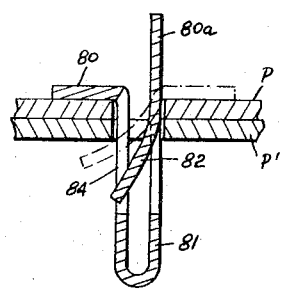

United States Patent Office 3,303,542
Patented Feb. 14, 1967

3,303,542
FASTENERS
Robert J. Holton, Cleveland, Ohio, assignor to Tinnerman Products, Inc., Cleveland, Ohio, a corporation of Ohio
Original application Feb. 14, 1963, Ser. No. 258,494, now Patent No. 3,208,122, dated Sept. 28, 1965. Divided and this application Jan. 13, 1965, Ser. No. 425,124
12 Claims. (Cl. 24—73)

This invention relates in general to fastening means and more particularly to malleable, deformable fasteners for securing two or more members together, such as a pair of supporting panels, or for the securing of a molding or the like to one or more panels. This is a divisional application of the pending United States patent application of Robert J. Holton, Serial No. 258,494, filed February 14, 1963, which issued September 28, 1965, as Patent 3,208,122.

The fastener means of the instant invention is adapted to be used in place of sheet metal screws, or nut and bolts, and may be expeditiously and readily applied to a panel, and secured thereto, and will effectively couple together the two or more members, which are to be attached.

Accordingly, it is an object of the instant invention to provide a deformable fastener, which may be readily inserted through aligned openings in two or more members, or through an opening in any one of the members, and deformed to a holding position, for securely attaching the members together.

Another object of the instant invention is to provide various forms of fasteners for tying or fastening together a pair of members, such as a pair of superimposed panels, and wherein the fastener comprises a comparatively small, inexpensive member of malleable sheet metal, which fastener is adapted to extend through apertures in the panel members, and to be deformed when in such aperture, into secure engagement with the panel members.

Another object of the instant invention is to provide a malleable sheet metal fastener, adapted to secure a pair of members together, such as for instance, a pair of panel members having aligned apertures therein, and wherein the fastener comprises a loop-like body portion, adapted to extend through the apertured panels, and a pair of tab portions connected to the body portion and projecting therefrom, and wherein the fastener is adapted to be deformed upon relative movement between the tab portions, such movement causing deformation of the body portion, for securing the fastener to the panel members.

A more specific object of the instant invention is to provide a fastener of the character described wherein the tab portions extend outwardly from one another and wherein there is provided fulcrum means on the fastener adapted for coaction upon movement of the tab portions toward one another, to facilitate deformation of the loop-like body portion into secured relation on the supporting members.

Other objects and advantages of the invention will be apparent from the following description taken in conjunction with the accompanying drawings wherein:

FIG. 1 is a top plan view of a fastener constructed in accordance with the instant invention;

FIG. 2 is an end elevational view of the fastener illustrated in FIG. 1, and showing in phantom lines a resilient cap-like sealing member assembled therewith for sealing the receiving aperture in a panel;

FIG. 14 is a generally perspective view of another modification of the fastener, and one adapted for securing wire or tubing or the like to an apertured panel or the like;

FIG. 15 is a generally perspective view of the fastener of FIG. 14 and securing a tubular member to a panel;

FIG. 16 is a generally perspective view of another modification of the fastener and one which is adapted for securing a generally triangular shaped member, such as a molding or the like, to a panel;

FIG. 17 is a generally perspective view of the fastener of FIG. 16 adapted for attaching a generally triangular shaped member, such as a molding or the like, to a panel;

FIG. 18 is a generally perspective view of another modification of the fastener;

FIG. 19 is a generally perspective view of the fastener of FIG. 18 and adapted to secure an object, such as a molding, as shown in phantom lines;

FIG. 20 is a generally perspective view of another modification of the fastener;

FIG. 21 is a generally perspective view of a further modification of the fastener;

FIG. 22 is a sectioned, elevational view showing a further modification of the fastener as mounted on a pair of apertured panels; in phantom lines there is illustrated the deformed position of the fastener for securing the panels together;

FIG. 23 is a generally perspective view of a still further modification of the fastener;

FIG. 24 is a sectional view of the fastener of FIG. 23 as mounted in the aperture of a panel, and ready for deformation into secured position on the panel; the phantom lines illustrating this deformed condition;

FIG. 25 is a sectional view of the fastener of FIG. 23 utilizing an alternate method of installing the fastener for securement to a panel or panels, and illustrating the position of the fastener after it has been deformed into secured relation on the panel;

FIG. 26 is a sectional view of the fastener of FIG. 23 as mounted in the apertures in the panels, and illustrating another alternate method for installing the fastener with the panels, and illustrates the deformed position of the fastener in secured relation on the panel;

FIG. 27 is a top plan view of a still further modification of the fastener;

FIG. 28 is an end elevational view of the fastener of FIG. 27;

FIG. 29 is a side elevational view of the fastener of FIGS. 27 and 28;

FIG. 30 is an end elevational view of the fastener of FIGS. 27 to 29, as mounted in deformed condition on a pair of apertured panels, and securing the panels together; and FIG. 31 is a reduced size, bottom view of the fastening arrangement of FIG. 30 and taken along the plane of the line 31—31 of FIG. 30, looking in the direction of the arrows.

Figure 3:
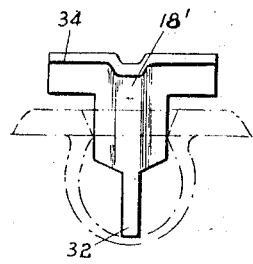
FIG. 3 is a side elevational view of the fastener illustrated in FIGS. 1 and 2, and further showing in phantom lines the resilient sealing member mounted thereon.

Referring now again to the drawings and in particular to FIGS. 1 to 3 thereof, there is shown a fastener or clip 10 comprising a generally vertically oriented, loop-like body portion 32, having outwardly divergent, generally T-shaped sections defining tabs 34 and 34a for readily actuating the fastener to deform the loop-like body portion 32 into secured relationship on an apertured support panel or the like. The fastener 10 may be formed from a single piece of deformable, malleable material, such as for instance sheet metal, and for example cold rolled steel. Such malleable metal possesses the characteristics that it may be generally permanently deformed upon application of a predetermined force, as distinguished from a purely spring-type metal which when bent will generally return to its original position upon removal of the bending or distorting force.

The clips of the present invention may be formed from blanks having outlines of paired, generally T-shaped configurations connected together by the loop-like body portion 32 which is of a reduced transverse width compared to the transverse width of the tabs 34 and 34a. As can best be seen in FIGS. 1 and 2, the generally angular T-shaped sections of the clip are preferably deformed or embossed outwardly, as at 18, to add strength to the clips in that area, and also to provide confronting fulcrum portions 18a (FIG. 2) adapted for engagement against one another upon movement of the tabs 34 and 34a toward one another to deform or collapse the loop-like body portion 32 into secured relation with a panel.

In FIGS. 1 and 2 it can be seen that the loop-like body portion 32 is of a substantially lesser width as compared to the width of the generally T-shaped portions of the clip, and of a lesser width than even the embossed ribs 18 formed by deformation of the T-shaped sections of the clip. Accordingly, upon application of inward pressure on the tabs 34 and 34a, as for instance by a pair of pliers operated by a workman, the confronting fulcrum portions 18a engage one another upon pivoting of the tabs 34 and 34a toward one another to cause spreading deformation of the loop-like body portion 32 into secured relationship with a panel or panels. A pair of support panels, are illustrated at P and P' of FIG. 30.

In this form, loop-like body portion 32 of the clip 10 is of a generally elliptical or arcuate configuration, in elevation, adapted for holding coaction with a resilient, cap-like member S, which is constructed and arranged to receive the loop-like body portion 32 of the clip in the interior of the resilient cap, and to coact therewith, as at 33, in maintaining such resilient sealing member in assembled condition with the fastener. Reference may be had to United States Patent Nos. 2,924,864 and 2,995,90, issued February 16, 1960, and August 15, 1961, respectively, to Robert J. Holton, for a more detailed description of the resilient sealing members which may be utilized with the clip. During deformation of the clip caused by movement of the tabs 34 and 34a toward one another, the loop-like body portion 32 is deformed and thereby also deforming the resilient sealing member S and urging it into positive sealing relation, in the aperture provided in the panel, thus preventing the entry or movement through the aperture of moisture, dust, foreign matter or the like. It will be noted that in FIGS. 1 to 3, the embossed ribs 18 extend fully to the uppermost extremity of the tabs 34 and 34a and do not terminate short of such extremities.

The openings or apertures in the panels through which the fastener or clip extends may be of any desired configuration but are preferably of a generally circular configuration, which is usually the most economical type of opening to provide, and the fastener is initially easily received through such aperture preparatory to deforming the same into secured position on a panel. The laterally projecting T-shaped sections defining the tabs 34 and 34a are adapted to engage the uppermost surface of the panel, and the collapsing of the loop-like body portion 32 causes the embossments of ribs 18 to cam against the defining boundary of the aperture on the opposite or under side of the panel, hereby to urge the panels together when two or more of the panels are disposed in superimposed relationship. It will be noted that substantially all deformation of the clip or fastener occurs in the loop-like body portion 32. Once the fastener is deformed into its secured relation on a panel or panels, the loop-like body portion 32, which has been deformed into a more or less linear configuration, acts as a beam extending between the T-shaped sections defining the tabs 34 and 34a and thus assures that the fastener is maintained in secured relation on the panels to positively secure them together. It will be seen therefore that such clip or fastener arrangement can readily be utilized for attaching panels of various thicknesses together.

Figure 4:
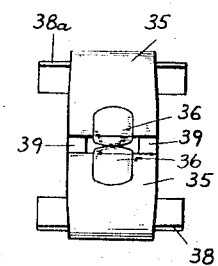
FIG. 4 is a top plan view of a modification of the fastener.
Figure 5:
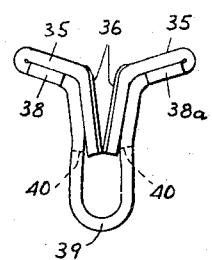
FIG. 5 is an end elevational view of the fastener of FIG. 4.
Figure 6:
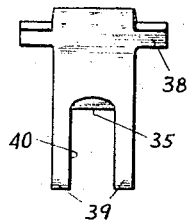
FIG. 6 is a side elevational view of the fastener of FIGS. 4 and 5.
Figure 7:
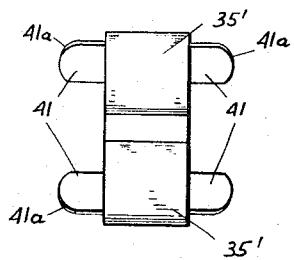
FIG. 7 is a top plan view of another modification of the fastener.

The fastener of FIGS. 4, 5 and 6 includes return bent end portions 35 which are bent back against the respective T-shaped section of the fastener, and are provided with inwardly facing embossments 36, which coact with one another as fulcrums upon predetermined movement of the winged tabs 38, 38a, toward one another. It will be seen that the body portion in this instance is formed by severing out, as at 40, the central section of the loop-like body portion. As best shown in FIGS. 5 and 6, it is preferable that the return bent ends 35 extend below the uppermost extremity of the respective aperture 40 defined between the deformable strap portions of the fastener. This increases the deformability or collapsibility of the body section, making it easier to secure the fastener onto a supporting panel or part.

Figure 8:
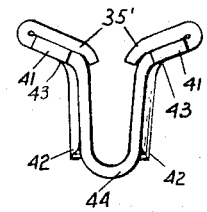
FIG. 8 is an end elevational view of the fastener of FIG. 7.
Figure 9:
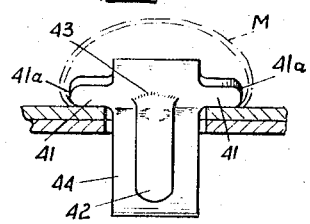
FIG. 9 is a side elevational view of the fastener of FIGS. 7 and 8 as mounted on a pair of apertured panels; in phantom lines there is shown a molding secured to the panels by the fastener.
Figure 10:
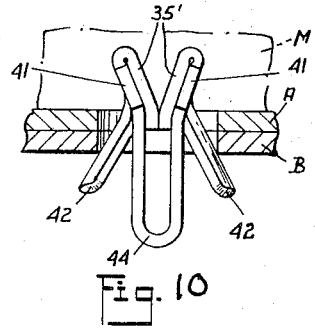
FIG. 10 is an elevational, sectional view of the fasteners of FIGS. 7 to 9 mounted in deformed condition on a pair of panels, and securing the panels together; in phantom lines there is shown a molding secured to the panels by the fastener.

FIGS. 7 to 10 inclusive disclose a fastener of a somewhat similar type as that of FIGS. 4 to 6, but wherein the wings 41 of the T-shaped sections of the fastener have rounded edges, as at 41a, adapted for snap fastening, camming coaction with a generally U-shaped resilient molding M, of well known type, for holding the molding in assembled relation on the supporting panel or panels to which the fastener is secured. It will be noted that the return bent end sections 35' in the fastener illustrated in FIGS. 7 to 10 are not of the length of those of FIGS. 4 to 6, nor are such end sections embossed. Moreover, the body section includes tongues 42, partially severed from the body section and connected substantially only at their uppermost ends thereof as at 43, to the fastener tabs, and upon actuation of the latter toward one another, such tongues are pivoted outwardly into secured relation with the underside of the supporting panel B, as shown in FIG. 10. The wings 41 coacting with panel A, secure the fastener on the other side of the juxtaposed panels. With the rounded edges of the wings in this type of fastener, the U-shaped molding or trim can be readily secured to the fastener and held in attached relation to the supporting panel or panels.

It will be seen that with this embodiment of fastener, the return bent ends 35' terminate at their lower ends adjacent the connections 43 of the tongues 42 to the tabs 41, and such tabs upon predetermined movement toward one another actually may bend with respect to the loop sections 44 of the body when actuated to secure the fastener to the panel. The loop sections 44 of the body are not materially deformed upon actuation of the tabs, but it is the partially severed tongues 42 which deform or move outwardly, to attach the fastener to the supporting panel.

Figure 11:
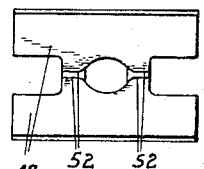
FIG. 11 is a top plan view of another modification of the fastener.
Figure 12:
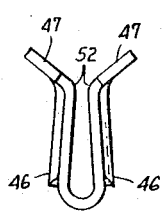
FIG. 12 is an end elevational view of the fastener of FIG. 11.
Figure 13:
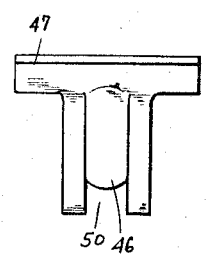
FIG. 13 is a side elevational view of the fastener of FIGS. 11 and 12.

The fastener illustrated in FIGS. 11 to 13 inclusive is a generally simplified form of fastener as compared to that of FIGS. 8 to 10, in that it has no return bent end sections, but it does embody the partially severed tongues 46 formed from the body section of the fastener, and which are adapted to move outwardly with respect to one another upon inward movement of the tabs 47 toward one another to generally permanently deformed positions on the supporting panel. In this ebodiment, the loop sections of the body, formed by the partially severed tongues, have been separated as at 50 to increase the outward movement ability of the tongues of the fastener. In this arrangement, areas 52 on the fastener provide fulcrums for pivoting of the tabs toward one another thereby causing outward movement of tongues 46 away from one another.

Figure 14:
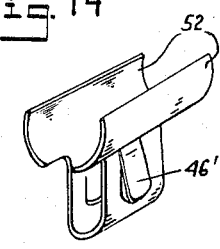

In FIGS. 14 and 15 there is shown a fastener of the general type illustrated for instance in FIGS. 11 to 13, but wherein the head portion 52 of the fastener has a more or less vertically oriented generally arcuate configuration of tabs, which head portion is adapted to grip a tubular or cylindrical member Z therebetween, upon deformation of such head portion tabs toward one another, thereby causing outward movement of tongues 46' and securement of the fastener to the supporting panel.

FIGS. 16 and 17 illustrate a fastener of the same general type as that in connection with FIGS. 14 and 15, but wherein the head portion tabs 56 are of generally vertically oriented, angular configuration, so that when such head portion tabs are bent toward one another, to thus deform the tongues 58 of the body section outwardly, and into secured relation with the supporting panels, the head portion forms a generally diamond shaped abutment adapted to hold a triangular shaped molding or trim T in place on the supporting panel. Such triangular shaped trim may be of conventional, resilient, snap fastening type, which can be pushed down over the head of the fastener, and then, due to the inherent resiliency of the trim, snaps into engagement on the underside of the head.

FIGS. 18 and 19 illustrate a fastener having partially severed lubs 60 which extend outwardly from the tabs 62 of the fastener head, and which when the fastener is disposed in deformed relation on the supporting panel (FIG. 19) provide abutments for receiving therein a generally A-shaped type of trim or molding L in snap fastening holding coaction, and thus hold the molding on the supporting panel. It will be understood that when the fastener is in assembled condition on the supporting panel, the tabs 62 of the head portion may be disposed substantially vertically as shown, and therefore at least one of the outwardly projecting lugs 60 on such tabs, coacts readily in overlying snap fastening holding relation with the inwardly disposed beveled edge 63 on the molding.

FIG. 20 discloses a further embodiment of fastener, wherein the body section is provided with a plurality of tongues 66 partially severed from the sides of the body section 64 and disposed along the peripheral edges thereof. Upon deformation of the head tabs 68 of the fastener toward one another to generally permanently deformed positions, the partially severed tongues 66 are caused to swing or deform outwardly into secured relationship with the supporting panel.

FIG. 21 discloses a further embodiment of fastener wherein the body section 70 of the fastener is provided with a predetermined size of apertures 72 therethrough, and also is beveled or recessed outwardly as at 74, to separate and weaken the U-shaped body portion of the fastener, to thereby greatly facilitate the outward collapsing of the loop along bend areas 76 upon movement of the head tabs 78 toward one another. As can be readily seen, the fasteners of FIGS 20 and 21 are extremely simplified, and readily lend themsleves to mass production procedures.

FIG. 22 discloses a fastener wherein the head tabs 80, 80a which may be of the exterior configuration of those of FIG. 21, are disposed angularly with respect to one another, one extending generally vertical while the outer (80) is extending in more of a horizontal or longitudinal direction, and wherein the body section 81 is partially severed to provide an inwardly projecting tongue 82 on one side thereof, and the body section is apertured or severed to provide an opening 84 on the other side thereof, in confronting relationship with the tongue and receives the tongue therein so that the fastener as shown can be generally inserted into apertures in a pair of supporting panels P, P'. Upon deformation of the vertical tab 80a, this causes deformation of the tongue upwardly to the phantom line position illustrated, thereby locking the fastener to the underside of the supporting panel P'.

FIGS. 23 and 24 disclose a generally U-shaped fastener wherein one side of the fastener body section 86 is provided with an aperture 88 therein and receives a tongue 90 partially severed as at 90a from the other side of the fastener. One, 92, of the head tabs of the fastener is preferably generally obliquely disposed, as shown, and the other, 94, of the tabs is deformed upwardly preferably centrally thereof, as at 96, so that it can be readily grasped with a pair of pliers or other like tool in the deformation of such tab 94 toward the other tab 92. The tongue 90 acts as an anchor and upon upward movement of the tab 94 toward the other tab 92 collapsing of the weaker side 98 of the fastener into the generally phantom line position illustrated occurs, thereby causing deformation of the body portion of the fastener and securement of the fastener to the supporting panel and causing locking of the two panels together. It will be noted that wings 100 on tab 92 are adapted for engagement with the confronting panel P adjacent the fastener receiving apertures through the panels.

FIG. 25 shows an alternate method of deforming the fastener of FIG. 23 and securing it to the supporting panels P, P'. In this arrangement, both tabs 92 and 94 are deformed toward one another, thereby causing collapsing of the weaker side 98 of the fastener, which has a substantial portion of the material thereof removed, and into the protruding holding position illustrated with respect to panel P', while causing some upward movement of tab 92 in attempting to pull the fastener body through the opening in the panel, as such tab pivots on wings 100, and resulting in some lengthwise movement of the tongue 90 and generally into engagement with the underside of the panel P'.

FIG. 26 illustrates another alternate method of deforming the fastener of FIG. 23, and in this arrangement, only tab 92 is deformed upwardly to the general position illustrated, such bending of tab 92 causing some movement of side 101 of the fastener toward side 98 and causing the wings 100 on the tab to tend to pull the fastener body 86 up through the panel hole, resulting in deformation of the tongue 90 in the general manner illustrated. In this arrangement, since substantially all of the force on the body is exerted upwardly, no collapsing of the weaker side 98 of the fastener body occurs.

FIGS. 27 through 31 disclose a further embodiment of fastener which is generally similar to that shown for instance in FIGS. 1 through 6, and comprising generally confronting T-shaped portions 118, including the outwardly directed boss or rib portions 120, and a loop-like depending portion 122, with the tabs 123 including the wings 124 thereon, adapted to engage the confronting surface of the panel, for restricting movement of the fastener through the opening in the panel or panels in one direction. However, in this embodiment, there are additionally provided panel engaging legs 126 integrally formed with the loop portion 122, and extending upwardly into engagement with the diagonal surfaces 127 on the sides of the lever sections 128 of the T-shaped portions. Such panel engaging legs have generally widened and diagonally oriented top portions 130, as best shown in FIGS. 28 and 29, and upon pivoting of the tab portions 123 of the fastener toward one another on fulcrum surfaces 131, to cause outward movement of the lever sections 128 of the T-shaped portions away from one another, and thus deformation of the loop portion 122, the upper ends of the legs 126 outwardly with respect to the loop portion 122, and generally transversely of the movement of lever sections 128 to the positions illustrated in FIGS. 30 and 31. Such a fastener is an extremely high strength fastener and can resist considerable force applied to separate the secured panels P, P'. In other respects, the fastener of FIGS. 27 through 31 may operate substantially identically to the two fasteners represented by FIGS. 1 to 3 and 4 to 6 of the drawings.

From the foregoing description and accompanying drawings, it will be seen that the invention provides a deformable fastener which is adapted to be inserted through an aperture or opening in a supporting member such as for instance a panel or panels, and which is adapted to be deformed into a holding position for securely attaching two or more members together. The invention also provides a fastener which comprises a loop-like body portion and a pair of actuating tabs movable with respect to one another to cause deformation of the body portion into a locking condition on an apertured support panel.

The terms and expressions which have been used are used as terms of description, and not of limitation, and there is no intention in the use of such terms and expressions of excluding any equivalents of any of the features shown or described, or portions thereof, and it is recognized that various modifications are possible within the scope of the invention claimed.

I claim:
1. A fastening device adapted for insertion in an opening in a support member, said device comprising, a generally vertically oriented loop-like body portion adapted to be received through the opening in said support member, a pair of tab portions projecting upwardly from said body portion and disposed in laterally spaced relationship relative to one another, said tab portions being adapted for engagement with one side of said support member, at least one resilient tongue portion formed from the material of each of the opposed sides of said body portion and extending downwardly in the same general direction as said body portion, and means including fulcrum areas disposed adjacent the juncture of said body portion with said tab portions, said fulcrum areas being disposed in confronting spaced relationship for engagement against one another and adapted to cause pivotal movement of said resilient tongue portions outwardly away from said body portion and into engagement with the other side of said support member adjacent the opening therein upon pivotal movement of said tab portions toward one another and engagement of said fulcrum areas against one another.

2. A fastening device in accordance with claim 1, wherein each of said resilient tongue portions is integrally connected at its upper end adjacent the juncture of said body portion with a respective one of said tab portions.

3. A fastening device in accordance with claim 1, wherein said tab portions each include laterally projecting wing means for mounting an object, such as a molding, to said support member.

4. A fastening device in accordance with claim 1, wherein said resilient tongue portions are struck-out of the material of said body portion and said tab portions, said resilient tongue portions extending downwardly from said tab portions and generally parallel with respect to the opposed sides of said body portion.

5. A fastening device in accordance with claim 4, wherein said resilient tongue portions are resiliently connected at their upper ends adjacent the juncture of said body portion with the respective of said tab portions, said resilient tongue portions being adapted for pivotal movement about said integral connections and outwardly away from one another upon pivotal movement of said tab portions about said fulcrum areas toward one another.

6. A fastening device in accordance with claim 1, wherein said tab portions each include return bent portions extending inwardly toward one another, said return bent portions providing said fulcrum areas generally adjacent the juncture of said body portion with the respective of said tab portions.

7. A fastening device in accordance with claim 6, wherein said return bent portions terminate generally adjacent the juncture of said body portion with each of the respective tab portions.

8. A fastening device in accordance with claim 1, wherein said resilient tongue portions include a pair of resilient tongues struck-out of each of the opposed sides of said body portion, said pairs of tongues each being connected at their opposite ends adjacent the junctures of said body portion with the respective tab portions.

9. A fastening device in accordance with claim 1, wherein said tab portions have rounded end edges adapted for camming locking coaction with an object, such as a molding, adapted to be secured to said support member.

10. A fastening device in accordance with claim 1, wherein said tab portions are of an oppositely disposed, generally arcuate configuration, in end elevation, adapted for gripping engagement therebetween of a generally cylindrical object upon movement of said tab portions toward one another.

11. A fastening device in accordance with claim 1, wherein said tab portions are each bent into an oppositely disposed angular configuration, in end elevation, adapted for snap fastening engagement with an object, such as a molding, applied exteriorly thereto for securement of the same to said support member.

12. A fastening device in accordance with claim 1, wherein said tab portions are of a generally flat planar configuration and extend divergently outwardly away from one another in a direction away from said body portion, each of said tab portions including a lug projecting outwardly therefrom adapted for snap-fastening engagement with an object, such as a molding, applied exteriorly thereto for securement of the same to said support member.

References Cited by the Examiner

UNITED STATES PATENTS

| | | | |
|---|---|---|---|
| 776,549 | 12/1904 | Redington | 24—259 |
| 2,154,712 | 4/1939 | Van Uum | 85—5 |
| 2,166,916 | 7/1939 | Lombard | 24—73 |
| 2,511,808 | 6/1950 | Petri | 24—259 |
| 2,720,289 | 10/1955 | Henrickson | 52—488 |
| 2,761,188 | 9/1956 | Bedford | 24—73 |
| 3,082,665 | 3/1963 | Jackson | 189—78 X |

WILLIAM FELDMAN, *Primary Examiner.*

E. SIMONSEN, *Assistant Examiner.*